Oct. 22, 1963 A. C. FINN 3,107,888
AIRPLANE-LIKE KITE
Filed Dec. 26, 1961 2 Sheets-Sheet 1
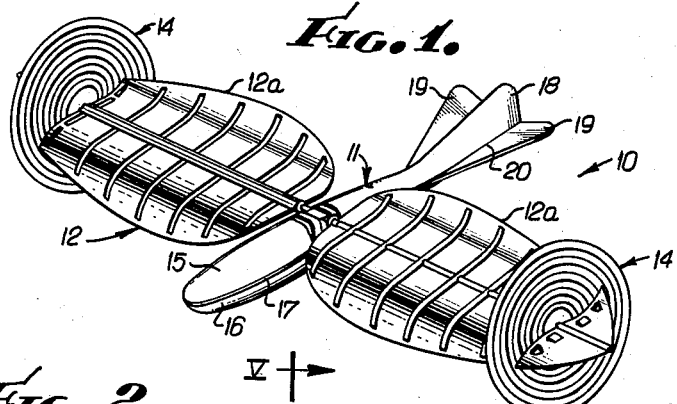
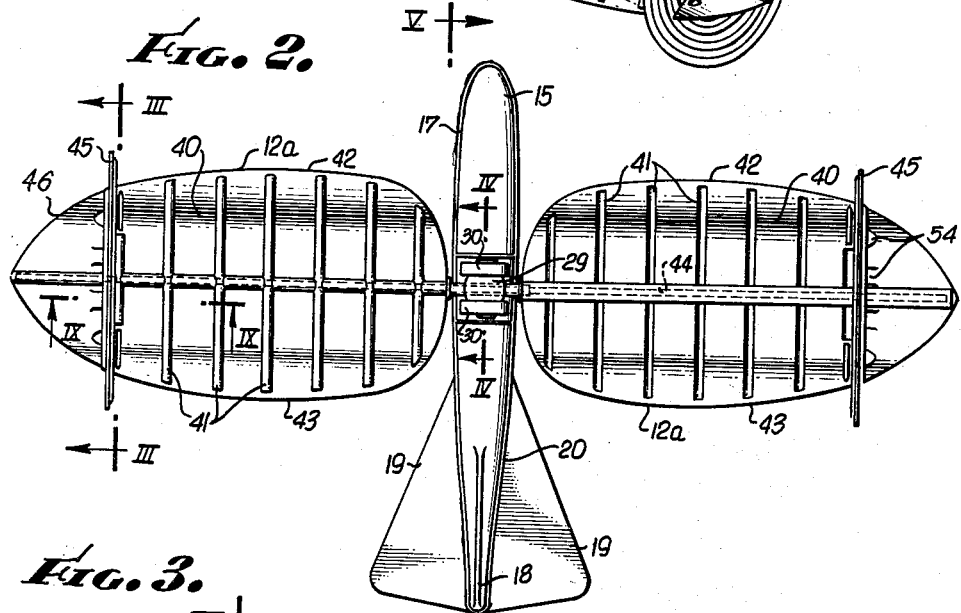
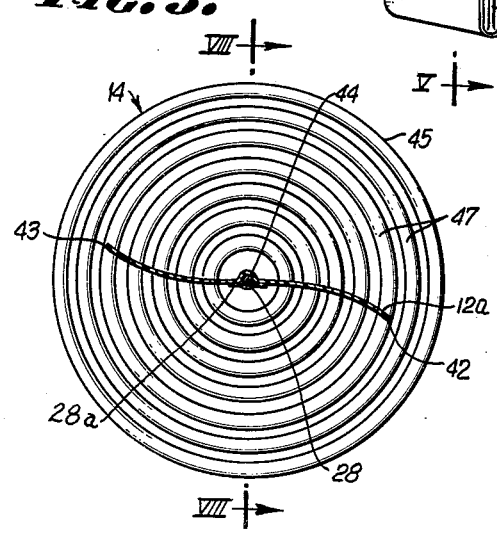
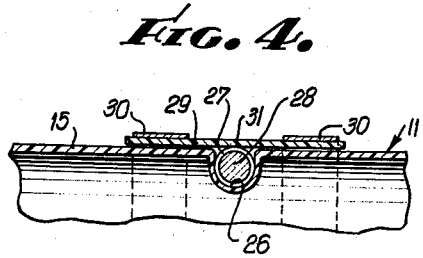
INVENTOR.
ALFRED C. FINN
BY
Miketta and Glenny
ATTORNEYS.

INVENTOR.
ALFRED C. FINN
BY
Miketta and Glenny
ATTORNEYS.

United States Patent Office 3,107,888
Patented Oct. 22, 1963

3,107,888
AIRPLANE-LIKE KITE
Alfred C. Finn, Santa Ana, Calif.
(17711 Westbury Lane, Tustin, Calif.)
Filed Dec. 26, 1961, Ser. No. 161,783
11 Claims. (Cl. 244—154)

This invention relates to a kite which simulates an airplane in appearance and in flight characteristics, particularly in take-off, in the air and in landing. More particularly, the invention relates to an airplane-like kite adapted to be flown both indoors and outdoors.

The present invention contemplates a kite employing rotatable wings to maintain the kite in flight. Prior proposed kite constructions have employed rotatable wings (Patent 2,593,979), however, such prior proposed kite constructions known to me have been relatively complicated, expensive to manufacture, and afforded no protection to the kite when the kite was landed.

Generally speaking, the present invention contemplates a kite construction simulating an airplane wherein rotatable wing means are detachably mounted on a fuselage body in novel manner, and the wing means carry means for stabilizing the kite in flight, for permitting the kite to land and take off as an airplane, and for protecting the kite when landing. The present invention embodies a construction which facilitates manufacture of the kite and which provides an extremely lightweight, strong, rigid structure.

The primary object of this invention is to design and provide a kite simulating an airplane and adapted for use outdoors or indoors.

An object of the invention is to design and provide a kite construction utilizing lightweight plastic materials, molded to provide structurally rigid yet very lightweight fuselage, wing and landing gear members.

Another object of the invention is to design and provide an airplane-like kite which may be readily shipped in knock-down form and which may be readily assembled and placed in flight condition in an extremely short time.

Still another object of the invention is to design and provide a kite construction wherein means are provided adjacent the end of each wing member for serving as landing gear means, flight stabilizing means and protection means.

A further object of the invention is to design and provide an airplane-like kite as mentioned above wherein the landing gear means includes spaced disc-like members carried at opposite ends of the wing means and each having a diameter greater than the width of the wing means.

A still further object of the invention is to design and provide for an airplane-like kite as mentioned above having curved leading and trailing edge portions and having spaced parallel reinforcing means extending between said edge portions for imparting strength and rigidity to said curved edge portions.

The present invention further contemplates the provision of disc-like members at the ends of a wing means for providing landing gear means and wherein said disc-like members are provided with a plurality of concentric reinforcing rib means.

Various other objects and advantages of the present invention will be readily apparent from the following description of the drawings in which an exemplary embodiment of the invention is shown.

In the drawings:

FIG. 1 is a perspective view of a toy kite embodying this invention.

FIG. 2 is a top plan view of the kite shown in FIG. 1.

FIG. 3 is a sectional view taken in the plane indicated by line III—III of FIG. 2.

FIG. 4 is a fragmentary sectional view taken in the plane indicated by line IV—IV of FIG. 2.

Figure 5:
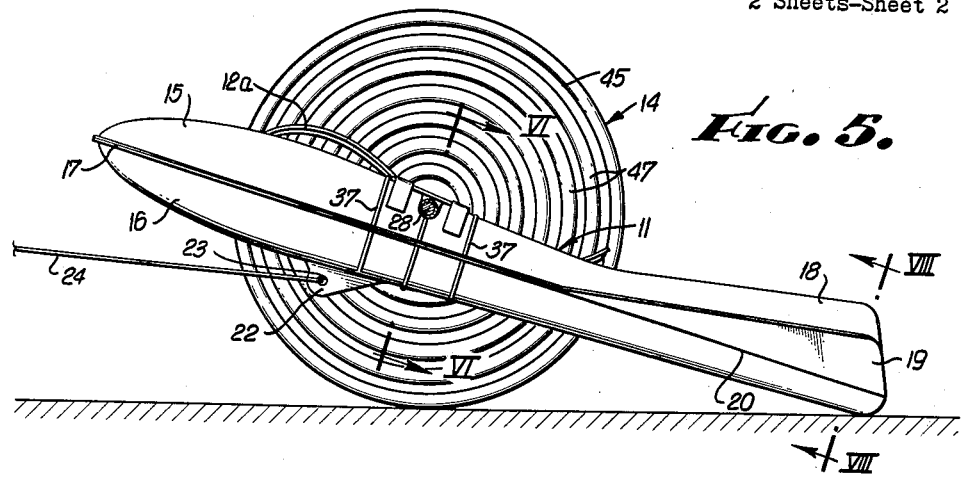
FIG. 5 is a side elevation showing the attitude of the kite on the ground before take-off.
Figure 7:
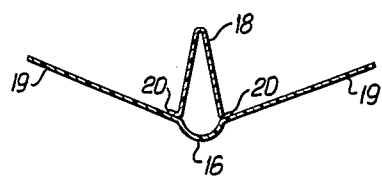
FIG. 7 is a sectional view taken in the plane indicated by line VII—VII of FIG. 5.
Figure 6:
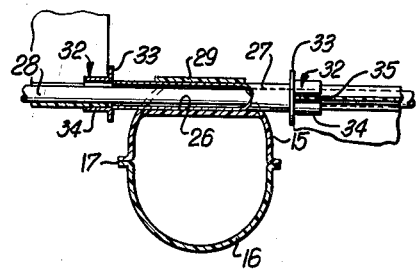
FIG. 6 is a fragmentary sectional view taken in the plane indicated by line VI—VI of FIG. 5.
Figure 8:
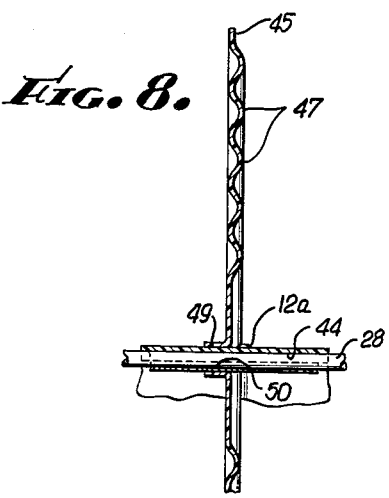
FIG. 8 is a fragmentary sectional view taken in the plane indicated by line VIII—VIII of FIG. 3.
Figure 9:
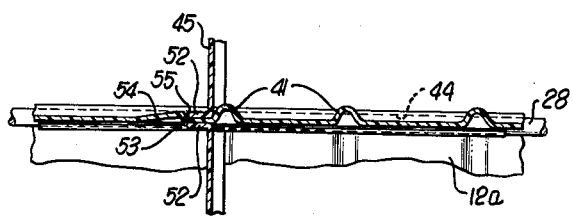
FIG. 9 is a fragmentary sectional view taken in the plane indicated by line IX—IX of FIG. 2.

In FIG. 1 there is shown a toy kite generally indicated at 10 embodying this invention and simulating in appearance, overall features of an airplane. The kite 10 generally comprises a fuselage means 11, a wing means 12, and stabilizing, landing and protective means 14 provided adjacent each end of the wing means 12. As shown in FIG. 5 the stabilizing means 14 serves as landing gear means described hereafter in greater detail.

The fuselage means 11 may be made of suitable light weight plastic and synthetic materials capable of being formed in a mold. The fuselage means 11 is hollow thruout its length and includes a top fuselage portion 15 and a bottom fuselage portion 16 adapted to be joined and bonded together with suitable adhesive along a joint line 17. The fuselage portions 15 and 16 form the skin or wall of the fuselage and the plastic material selected has characteristics of strength and rigidity to maintain its molded shape with a very thin wall section without the addition of internal bracing or strengthening members. The top portion 15 is provided with an integral suitably shaped, elongated tail fin 18 and the bottom fuselage portion 16 is provided with suitably shaped elevator sections 19 integrally formed with the bottom portion 16 and joined to the top portion along joint lines 20 which are continuous with joint line 17. The overall structure of fuselage means 11 appears as a streamlined fuselage body such as those constructed for high speed jet aircraft. The bottom fuselage portion 16 may be provided with a depending longitudinally extending integral attachment fin 22 ported as at 23 for connection thereto of one end of a kite string or cable 24. The kite string 24 may be any suitable string or cord.

Above and rearwardly of attachment fin 22 the top fuselage portion 15 may be provided with a transverse recess 26 integrally formed with the skin or top wall of portion 15. The recess 26 is deep enough to receive and retain a thin walled metal bearing sleeve 27 which extends slightly beyond vertical side wall surfaces of top fuselage portion 15. The sleeve 27 may be made of aluminum, plastic or other light weight metal. The metal sleeve 27 may be retained in the recess 26 by a retainer plate 29 of plastic material and having end portions secured against the top surface of the fuselage portion 15 as by spaced adhesive bands 30. The adhesive bands 30 may be of any suitable material carrying a pressure sensitive adhesive which will releasably adhere to the plastic surface of the fuselage. The retainer plate 29 bears as at 31 against the top edge of sleeve 27.

Inserted through sleeve 27 may be a straight light weight wing support rod 28 which extends almost to opposite ends of wing means 12. Bearing sleeve 27 is held against longitudinal movement relative to wing support rod 28 and wing members 12a carried thereby by means of spaced flanged bushings 32 carried on inner ends of wing members 12a. Each bushing 32 includes a flange 33 seated against one end of sleeve 27 and a cylindrical body portion 34 having generally diametrically opposite slots 35 adapted to receive an adjacent wall section of wing member 12a. Thus, when sleeve 27 is secured relative to the fuselage, the wing members 12a are held in spaced relation to the fuselage and are freely rotatably mounted by support rod 28 and bearing sleeve 27.

The fuselage means 11 may be provided with integral spaced transversely encircling reinforcing ribs 37 adjacent the mounting of the wings in order to provide additional rigidity to the fuselage body.

Each wing member 12a may comprise an elongated wall 40 of plastic material of predetermined thickness and rigidity. The plan of wall 40 may be generally elliptical having a rounded inner end edge and a somewhat pointed outer end edge. The plan of the wing may be varied.

Preferably, the wall 40 is as thin as possible in order to provide a light weight wing. Because of its thin section, each wall 40 is provided with a plurality of spaced reinforcing ribs 41 extending parallel to the longitudinal axis of the fuselage and terminating adjacent leading edge 42 and trailing edge 43 of the wing. The reinforcing ribs 41 may be integrally molded into wall 40 and in cross section are generally semi-circular. Adjacent the approximate longitudinal center line of wall 40, each wing is provided with a longitudinal, semi-circular in section, groove 44 for receiving wing support rod 28. Adhesive strip 28a overlies rod 28 and adjacent wall portions to join rod 28 and a wing member 12a in assembly. In this example, the leading edge 42 of each wing member 12a is turned downwardly in a smooth curve of short radius as best seen in FIG. 1. The trailing edge 43 is likewise and similarly curved upwardly so that with respect to the longitudinal axis of the wing means 12 the curvature of the wing is essentially symmetrical. The reinforcing ribs 41 extend into said curvature and serve to reinforce the leading and trailing curved portions of the wing member. Ribs 41 integrally merge with the material forming groove 44 and provide therewith a longitudinally and laterally reinforced wing member.

Means for stabilizing the kite in flight and also for providing landing and take off means while protecting the kite is provided by disc-like members 45 of circular form secured adjacent wing tips 46 of wing means 12. Each member 45 has a diameter which exceeds the width of wing means 12 so that leading and trailing edges 42 and 43 will not contact a ground surface as best indicated in FIG. 5. Each member 45 lies in a plane which is virtually normal to wing support rod 28. Each member 45 includes a plurality of integral concentric reinforcing ribs 47 to provide rigidity to the member 45 for landing purposes. The member 45 may be made of similar plastic material and of thin section in order to provide light weight.

Means for releasably and detachably mounting member 45 to wing tip 46 includes an integral hub portion 49 defining a port 50 for reception therethrough of wing support rod 28 and the semi-cylindrical curved wall section defining groove 44. Extending outwardly from opposite sides of hub portion 49 are spaced parallel flanges 52 defining therebetween a slot 53 configured to conform with the curvature of wall 40 of the wing member. The slot 53 terminates in spaced relation to the circumferential edge face of member 45.

Each member 45 may thus be slipped over wing tip 46 and as member 45 is positioned adjacent the outermost reinforcing rib 41, upper flange 52 is pressed over upwardly inclined spaced detents 54 which provide an abutment face 55 for retaining member 45 between the outermost rib 41 and detents 54. It will be apparent that member 45 is thus releasably attached to the wing member 12a and provides a relatively rigid disc-like member. Since members 45 extend over the outermost end portions of support rod 28, it will be apparent that ends of rod 28 are secured thereby. Outermost rib 41 may be segmented; the central part thereof rising from one surface and outer parts of the rib being oppositely directed and projecting from the other surface of the wing member. Detents 54 may be similarly oppositely directed so that disc member 45 is held against tilting from its normal vertical plane.

In flying the kite described above, it will be apparent that kite string 24 is attached to fin 22 in any suitable manner. The kite is faced into the wind and may be positioned on the ground as indicated in FIG. 5. When the kite is advanced into the wind, the kite will freely move across the ground with the disc members 45 serving as rotatable landing wheels or gear and spacing the wings from ground level. The lower end portion of the fuselage serves as a tail skid. As the kite is forwardly advanced, the members 45 will turn, the wings will begin to turn and the kite will generally simulate the appearance of an airplane on take off. As the kite leaves the ground, the rotation of the wings provides lifting force, which, with the forward motion of the kite, causes the kite to climb quite rapidly under low wind conditions of, for example, 5 to 10 miles per hour. In flight, it will be apparent that the kite string provides application of force at a point forwardly of the rotatable wing support and below the bottom of the fuselage. The stabilizing disc-like members 45 are virtually parallel to the axis of the fuselage and as the wings and discs rotate, the discs maintain their relationship in planes spaced from and parallel to the axis of the fuselage. Thus stability is achieved at the ends of the wing tips in addition to the stability afforded by the fin 18 and elevators 19. In the air, kite 10 simulates the appearance of a plane. It may be noted that when the kite taxies on the ground, the wings rotate in a direction opposite to that in flight because of rolling contact of disc members 45 with the ground. Thus, aerodynamically, the kite will hug the ground, but once sufficient speed is attained, take off occurs, and the wings rotate to lift the kite.

Upon descent of the kite, it will be apparent that when the kite almost reaches the ground and forward motion is imparted to it, the kite will simulate landing of an airplane.

While the kite 10 is arranged and designed for outside use, it will be readily apparent that kite string 24 may be relatively short and attached to one end of a rigid stick or wand. The kite may be then circled about a person holding the wand while indoors. Obviously, the length of the kite string depends upon the amount of inside space available for flying the kite. For small children, a wand and relatively short kite string may be used outside.

The construction and operation of kite 10 is such that, if desired, the free end of string 24 may be attached to a tricycle or bicycle and then by riding the bicycle against the wind, the plane or kite will simulate take off and landing and will follow the bicycle at a selected altitude, depending upon the speed of the bicycle and wind conditions.

It is important to note that the kite 10 described above may be readily packaged in knock-down form and quickly assembled. The fuselage portions may be adhesively secured together at the factory and the fuselage 11, wing members 12a, wing support rod 28, bearing sleeve 27 and stabilizing and landing members 45 separately arranged alongside each other. To provide a compact package, elevators 19 may be folded partially upwardly towards and against fin 18. With all of the parts so arranged, a relatively small elongated rectangular package may be made. If desired, the wing members 12a and rod 28 may be presassembled and balanced at the factory.

In assembly, rod 28 may be first inserted within sleeve 27, bushings 32 fitted on the inner edge portions of the wing members 12a, the wing members fitted on support rod 28 and secured at their wing tips by placing members 45 over the ends of the wing tips and locking members 45 between detents 54 and adjacent rib 41. The entire wing assembly may then be mounted on the fuselage body with bearing sleeve 27 received in recess 26 and secured by retainer plate 29 and pressure adhesive strips 30. If elevators 19 have been folded too tightly against fin 18, they may be suitably bent downwardly to provide a sufficient selected dihedral angle. The assembled kite is then ready for flight by the attachment of kite string 24 to the attachment fin 22.

It will be understood that factory preassembly of the wing means and rod will afford other modifications of the structure of the rod, wing members, bearing sleeve and fuselage. For example, the bearing sleeve may be centered on rod 28, the flanged bushings at opposite ends of the sleeve fixed as by crimping to the rod and the wing members 12a secured by adhesive strips to the rod after balancing and centering of the wing members thereon. The spacing of the bushings in this modification is important so that the inner edges of the wing members will not contact the sides of the fuselage body.

It will be understood that various modifications and changes may be made in the structure described above which come within the spirit of this invention and all such changes and modifications coming within scope of the appended claims are embraced thereby.

I claim:

1. A toy kite simulating an airplane in flight and in landing comprising: a hollow fuselage body of light weight, thin plastic material having an integral kite string attachment fin projecting downwardly therefrom; wing means including wing members carried by the fuselage body at the top thereof; means for rotatably mounting said wing means, including a straight wing support rod, extending across the fuselage and for substantially the length of the wing means a bearing sleeve on said rod, flanged bushings positioned adjacent ends of said sleeve, said fuselage body being provided with a transverse recess in a top wall thereof for receiving said sleeve, and a retainer plate of plastic material secured to said body over said sleeve; and means adjacent the end of each wing member securing an end of said rod with respect to said wing member.

2. A kite as stated in claim 1 wherein said means securing ends of the rod to said wing members include landing gear means.

3. A kite as stated in claim 1 wherein said means securing ends of the rod to said wing members include disc means having a diameter greater than the width of said wing members.

4. A kite as stated in claim 1 wherein each wing member includes a plurality of spaced reinforcing ribs integral therewith and lying parallel to said fuselage.

5. A kite as stated in claim 1 wherein said wing members are provided with aligned grooves to receive said support rod, and said securement means includes a member adapted to space said wing members from the ground.

6. A construction for a kite simulating an airplane comprising: a fuselage means having a string attachment fin projecting downwardly therefrom; wing means carried by and rotatably mounted at the top of the fuselage means; and means carried adjacent each end of said wing means including a disc-like member having a diameter greater than the width of the wing means and serving as landing means and as flight stabilizing means.

7. A construction as stated in claim 6 wherein each disc-like member includes a slot corresponding to the contour of the wing means and releasably attached to said wing means.

8. A construction as stated in claim 6 including means for retaining said disc-like member in assembly with said wing means and including detent means on said wing and a reinforcing rib on said wing.

9. A kite construction simulating an airplane comprising: a fuselage body; wing means rotatably mounted on the fuselage body; landing gear means adjacent each end of the wing means spacing said rotatable wing means from the ground while permitting rotation of the wing means when the kite is on the ground and serving as flight stabilizing means when the kite is off the ground; and means including a rod rotatably secured to said fuselage body, secured to said wing means, and supporting said landing gear means.

10. A kite as stated in claim 9 wherein said means adjacent each end of the wing means includes a circular edge face spaced radially outwardly from leading and trailing edges of said wing means.

11. A kite construction simulating an airplane comprising: an elongated fuselage body; wing means including wing members; means for supporting said wing members from the fuselage body at the top thereof including a transverse recess in said fuselage body, a bearing means in said recess, and a wing support rod extending through said bearing means and secured to said wing members along the length of said wing members; and landing and flight stabilizing means carried by said wing members adjacent ends thereof, said support rod also supporting said landing stabilizing means.

References Cited in the file of this patent

UNITED STATES PATENTS

| | | |
|---|---|---|
| 2,494,430 | Carnwath | Jan. 10, 1950 |
| 2,501,442 | Donaldson | Mar. 21, 1950 |
| 2,593,979 | Calhoun | Apr. 22, 1952 |
| 2,801,063 | O'Gorman | July 30, 1957 |
| 2,827,252 | Pohl | Mar. 18, 1958 |

FOREIGN PATENTS

| | | |
|---|---|---|
| 146,887 | Switzerland | July 16, 1931 |